United States Patent
Shirvanian et al.

(10) Patent No.: US 11,647,018 B2
(45) Date of Patent: May 9, 2023

(54) SECOND FACTOR FOR SECURE PASSWORD AUTHENTICATION

(71) Applicant: VISA INTERNATIONAL SERVICE ASSOCIATION, San Francisco, CA (US)

(72) Inventors: Maliheh Shirvanian, Palo Alto, CA (US); Shashank Agrawal, Palo Alto, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 469 days.

(21) Appl. No.: 16/567,750

(22) Filed: Sep. 11, 2019

(65) Prior Publication Data
US 2021/0075781 A1  Mar. 11, 2021

(51) Int. Cl.
*H04L 9/40* (2022.01)
*G06Q 20/40* (2012.01)
*H04L 9/32* (2006.01)

(52) U.S. Cl.
CPC ..... *H04L 63/0838* (2013.01); *G06Q 20/4012* (2013.01); *H04L 9/3242* (2013.01); *H04L 63/102* (2013.01)

(58) Field of Classification Search
CPC . G06F 21/31; G06K 9/00335; H04L 63/0838; H04L 9/3242; H04L 63/08; H04L 2463/102; H04L 9/3226; G06Q 20/4012
See application file for complete search history.

(56) References Cited

U.S. PATENT DOCUMENTS 10,438,225 B1 * 10/2019 Reading ............. G06Q 30/0225
2018/0121620 A1 * 5/2018 Bastide ................. G06F 16/334

FOREIGN PATENT DOCUMENTS

EP        3149645 B1 *  5/2018  ............. G06F 21/36
WO   WO-2018198036 A1 * 11/2018

OTHER PUBLICATIONS

Wu, M. ; Liu, B., Data hiding in binary image for authentication and annotation, IEEE transactions on multimedia, 2004, vol. 6 (4), p. 528-538.*

* cited by examiner

*Primary Examiner* — Ilse I Immanuel
(74) *Attorney, Agent, or Firm* — Loeb & Loeb LLP

(57) ABSTRACT

At an authorization server, a shared secret electronic key may be shared with a second computer. A selection to use a system to complete a transaction may be received from a first computing device. An image may be communicated to the first computing device. A digital representation entered by the user representing the image and a PIN based on the copy of the shared electronic key may be received from the second computing device. The system and method may determine if the digital representation entered by the user on the second computing device matches the image communicated to the first computing device. The system and method may determine if the PIN based on the copy of the shared electronic key from the second computing device is as expected. In response to determining the digital representation entered by the user matches the image and the PIN the second computing device is as expected, the user may be authorized.

18 Claims, 4 Drawing Sheets

SECOND FACTOR FOR SECURE PASSWORD AUTHENTICATION

BACKGROUND

Network security continues to be an issue. Logins and passwords have significant issues as logins and passwords may be guessed without significant difficulty. In addition, computers may be used to quickly guess large numbers of password and login combinations. In one attempt to make networks more secure, a second channel may be used to communicate a code to a user which the user may need to communicate back on a first channel to verify the user. However, the use of codes has been challenging to users and has not been as successful as hoped.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

A system and method of electronic authentication may be disclosed. At an authorization server, a shared electronic key may be shared. A copy of the shared electronic key may be communicated to an app on a portable computing device. A selection to use a system to complete a transaction may be received from a first computing device. An image may be communicated to the second computing device. A digital representation entered by the user representing the image and a one time PIN computed and automatically submitted using the key-ed function of a counter (HOTP) may be received from the mobile computing device. The system and method may determine if the digital representation entered by the user on the first computing device matches the image communicated to the second computing device. The one time PIN computed and automatically submitted using the key-ed function of a counter (HOTP) may also be communicated. The system and method may determine if the PIN from the first computing device is as expected. In response to determining the digital representation entered by the user matches the image and PIN is as expected, the user may be authorized.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

Specification

The present disclosure now will be described more fully hereinafter with reference to the accompanying drawings, which form a part hereof, and which show, by way of illustration, specific exemplary embodiments by which the disclosure may be practiced. These illustrations and exemplary embodiments are presented with the understanding that the present disclosure is an exemplification and is not intended to be limited to any one of the embodiments illustrated. The disclosure may be embodied in many different forms and should not be construed as limited to the embodiments set forth herein; rather, these embodiments are provided so that this disclosure will be thorough and complete, and will fully convey the scope of the disclosure to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Figure 1:
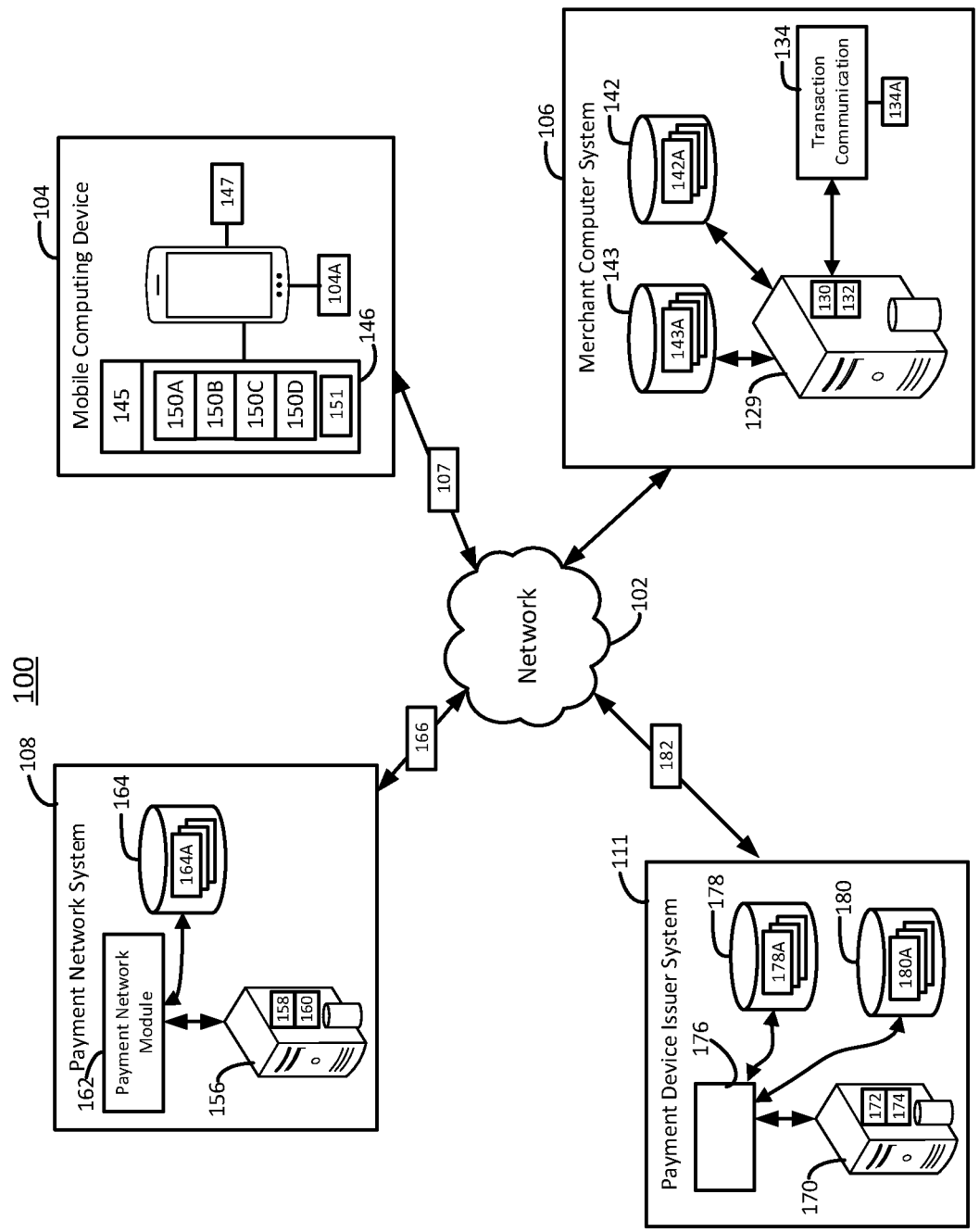
FIG. 1 may be an illustration of a payment environment.

FIG. 1 generally illustrates one embodiment of a system 100 for making purchases using second channel authentication. The system 100 may include a computer network 102 that links one or more systems and computer components. In some embodiments, the system 100 includes a mobile computing device 104, a merchant computer system 106, a payment network system 108 and a payment device issuer system 111.

The network 102 may be described variously as a communication link, computer network, internet connection, etc. The system 100 may include various software or computer-executable instructions or components stored on tangible memories and specialized hardware components or modules that employ the software and instructions in a practical application to manage network nodes for a transaction, as described herein.

The various modules may be implemented as computer-readable storage memories containing computer-readable instructions (i.e., software) for execution by one or more processors of the system 100 within a specialized or unique computing device. The modules may perform the various tasks, steps, methods, blocks, etc., as described herein. The system 100 may also include both hardware and software applications, as well as various data communications channels for communicating data between the various specialized and unique hardware and software components.

Networks are commonly thought to comprise the interconnection and interoperation of hardware, data, and other entities. A computer network, or data network, is a digital telecommunications network which allows nodes to share resources. In computer networks, computing devices exchange data with each other using connections, e.g., data links, between nodes. Hardware networks, for example, may include clients, servers, and intermediary nodes in a graph topology (e.g., the mobile computing device 104, the merchant computer system 106, the payment network system 108 and the payment device issuer system 111). In a similar fashion, data networks may include data nodes in a graph topology where each node includes related or linked information, software methods, and other data. A node such as the mobile computing device 104 may be managed to facilitate transactions with other nodes of the system (e.g., the merchant computer system) based on the data and instructions of various other nodes of the system 100.

It should be noted that the term "server" as used throughout this application refers generally to a computer, other device, program, or combination thereof that includes a processor and memory to process and respond to the requests of remote users/nodes across a communications network. Servers send their information to requesting "clients." The term "client" as used herein refers generally to a computer, program, other device, user and/or combination thereof that is capable of processing and making requests and obtaining and processing any responses from servers across a communications or data network. A computer, other device, set of related data, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The mobile computing device 104 may include a smartphone 104 or other computing device capable of sending and receiving a wireless digital communication. The mobile computing device may include a processor 145, a memory 146, and a battery 147. The mobile computing device 104 may include an RFID tag 104A or other device capable of sending a radio signal including mobile computing device data such as a battery charge level 107. The memory 146 of the mobile computing device 104 may include various modules including instructions that, when executed by the processor 145 control the functions of the mobile computing device 104 generally and integrate the mobile computing device into the system 100 in particular. For example, some modules may include an operating system 150A, a browser module 150B, a communication module 150C, and a wallet module 150D. The communication module 150C may include processor-executable instructions to send and/or receive a signal from contactless component of the system. In some embodiments, the communication module 150C may include an RFID receiver or instructions to implement an RFID receiver. The wallet module 150D may also include payment device data 151. The payment device data 151 may securely identify a payment device 250 (FIG. 2) and a user's payment account information to facilitate a transaction between the mobile computing device 104 and the merchant computer system 106. In some embodiments, the payment device data 151 may be tokenized such that only a trusted partner may access the payment device data 151.

The merchant computer system 106 may include a computing device such as a merchant server 129 including a processor 130 and memory 132 including components and instruction modules including processor-executable instructions to facilitate transactions with the mobile computing device 104 via other entities of the system 100. In some embodiments, the memory 132 may include a transaction communication module 134. The transaction communication module 134 may include instructions to send merchant messages 134A to other entities (i.e., 104, 108, 111) of the system 100 to indicate a transaction has been initiated with the mobile computing device 104 generally and wallet module 150D in particular including payment account data, location data, and other data as herein described. For example, a node of the system 100 (e.g., the mobile computing device 104 generally and the browser module 150B in particular) may access a merchant website to initiate a transaction. Some examples of transactions include ticket sales for specific seats at a venue.

The merchant computer system 106 may also include a transaction repository 142 and instructions to store payment and other transaction data 142A within the transaction repository 142. The merchant computer system 106 may also include a product repository 143 and instructions to store product and other data 143A within the product repository 143. In some embodiments, the merchant computer system 106 may also include instructions to send payment device data 151 corresponding to the payment device 250 (FIG. 2), transaction data 143A, and/or product data 143B and other data it received during a transaction to the payment network system from the mobile computing device 104.

The payment network system 108 may include a payment server 156 including a processor 158 and memory 160. The memory 160 may include a payment network module 162 including instructions to facilitate payment between parties (e.g., one or more users, merchants, etc.) using the system 100. The module 162 may be communicably connected to an account holder data repository 164 including payment network account data 164A. The payment network account data 164A may include any data to facilitate payment and other funds transfers between system entities (e.g., 104, 106 and 111). For example, the payment network account data 164A may include identification data, account history data, payment device data, etc. The module 162 may also include instructions to send payment messages 166 to other entities and components of the system 100 in order to complete transactions between the mobile computing system 104 and the merchant computer system 106. For example, the module 162 may include instructions to send a payment message 166 to a payment device issuer system 111 or other entity of the system 100 to complete a purchase transaction. The message 166 may include data to authorize a purchase transaction such as an authorization number or other identification, and may be tokenized or encrypted by the system 100 before the message 166 is sent over the network 102 to a system entity.

A payment device issuer system 111 may include a payment device issuer server 170 including a processor 172 and memory 174. The memory may include a payment device issuer module 176 including instructions to facilitate payment to the merchant computer system 106 using the system 100. The module 176 may be communicably connected to an issuer transaction data repository 178 including issuer transaction data 178A. The issuer transaction data 178A may include data to facilitate execution by the processor 172 of instructions included with the payment device issuer module 176 to facilitate payment and other funds transfers to/from the merchant computer system 106 and to/from the payment device issuer system 111. In some embodiments, the module 176 may include instructions to transfer funds corresponding to a purchase transaction upon receiving a payment message 166 from the payment network system 108. For example, the module 176 may include instructions to send an issuer message 182 including data and/or further instructions to the merchant computer system 106 that implement or indicate a funds transfer corresponding to a purchase transaction. The issuer transaction data 178A may include merchant identification data, user account history data, etc. The module 176 may also be communicably connected to a cardholder account data repository 180 including cardholder account data 180A. The module 176 may also include instructions to receive payment messages 166 from the payment network system 108 in order to manage nodes of the system 100 and complete transactions between users and/or merchants and better manage user and merchant funds account balances to complete transactions.

Figure 2:
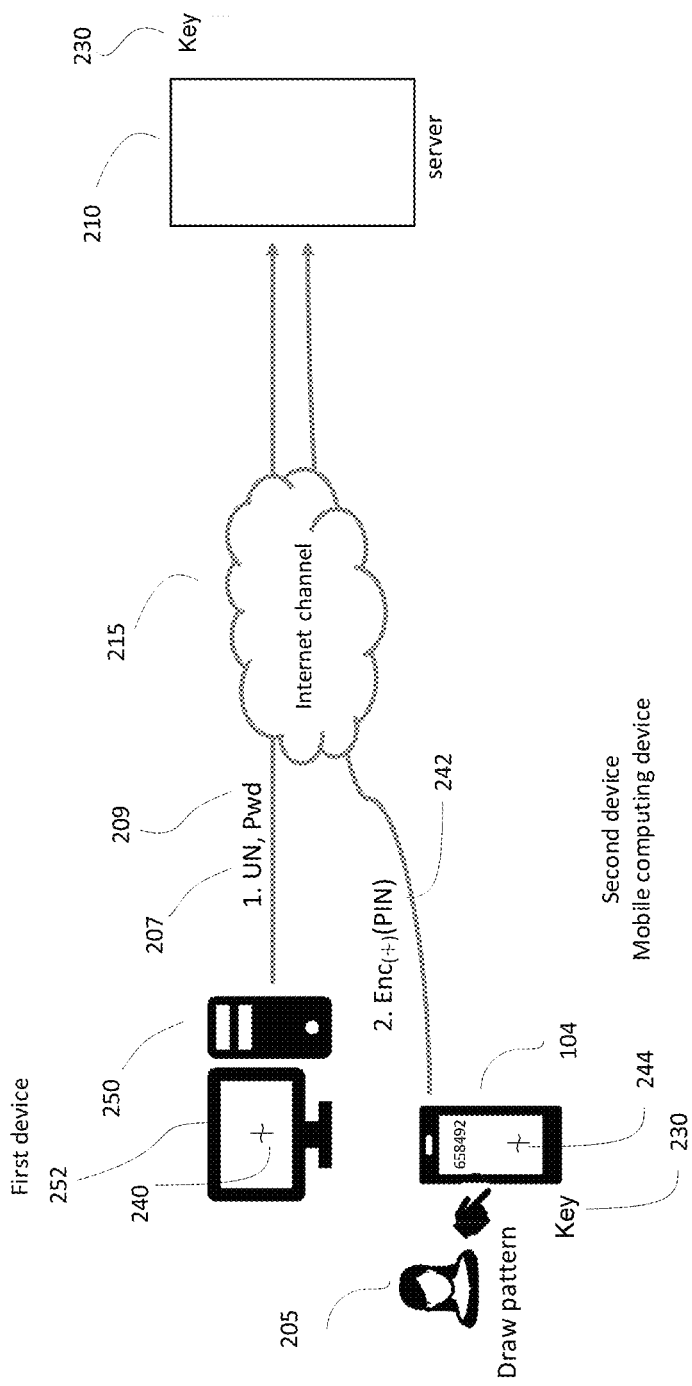
FIG. 2 may be a flow illustration of using a drawing as a second channel verification.

Referring to FIG. 2, at a high level, in the disclosed system and method, a user may select to use a payment service to transfer funds to a merchant. The user 205 may submit a user name 207 and a password 209 from a first device 250 to a server 210. The first device 250 may be a computing device such as a laptop, a desktop, a portable computing device or the like. The server 210 may determine if a registered device 104 is associated with the payment service. In some embodiments, the device 104 may have been registered previously.

The user 205 may prove to the server 210 the possession of a registered second computing device 104 such as a mobile computing device by generating and automatically submitting a one-time personal identification number (PIN) 242. In some embodiments, the PIN may be computed as the keyed function of a counter (HOTP which may be HMAC-based One-time Password algorithm where HOTP may be a one-time password (OTP) algorithm based on hash-based message authentication codes (HMAC)). During the registration, the server 210 and the device 104 may share an electronic key or secret key K 230. The electronic key K 230 may be used during the authentication to compute the one time PIN 242. To address a possible issue with the manual transfer of the code such as an unwanted user looking over a user's shoulder to steal the PIN, the device 104 may establish a channel 215 with the server 210 and may transfer the PIN 242 automatically.

The users' 205 presence may be verified by asking the user 205 to approve the validity of the authentication attempt similar to a push second factor authentication (Push 2FA). However, to address the security issues in the Push 2FA related to mistakenly (and neglectfully) approving an attacked session, the claimed push pattern 2FA may ask the user to draw a copy 244 of a random pattern 240 displayed on a display device 252 in communication with the first computing device 250 using the authorized device 104 to input the copy 244 of the random pattern 240. The displayed random pattern 240 may be valid only for the current session. The PIN 242 counter may be used to randomize the pattern 240. As the claimed method and system may transfer the PIN 242 over a secure Internet channel 215, there may be no need for trust on 3rd party 2FA service provide.

Figure 3:
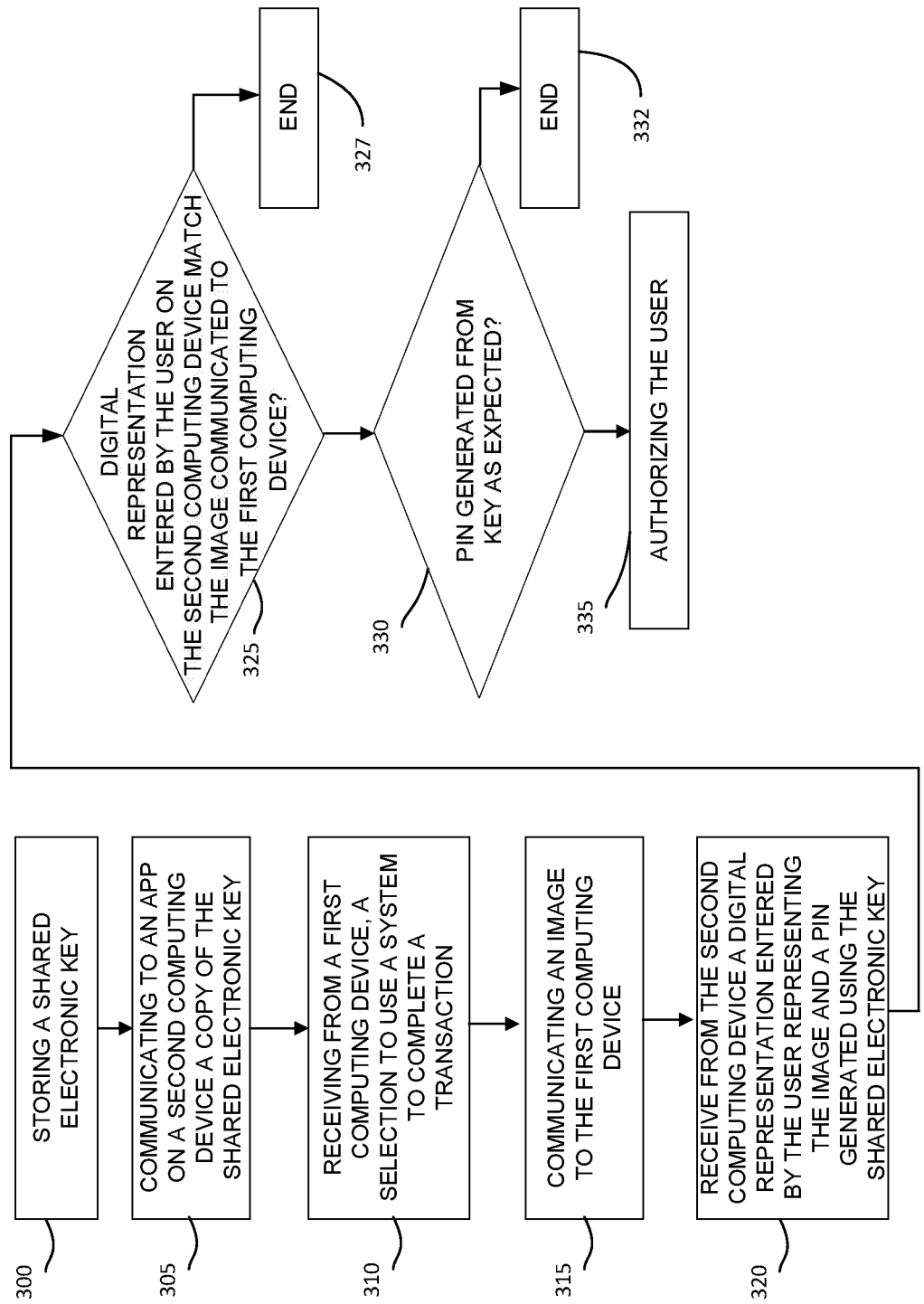
FIG. 3 may a flow chart illustrating blocks that may be executed by the processor.

Referring to FIG. 3, a method of electronic authentication is disclosed. At block 300, at an authorization server 210, a shared electronic key 230 may be stored. An electronic key 230 may be a password or alphanumeric key that end users enter to access a network. The electronic key 230 may follow a specific security protocol. For example, the key 230 may be 128 bits or 256 bits or 512 bits or any number of bits. The key 230 may be generated in a way that makes the key difficult to guess. As an example, the key may be the result of a hash function.

At block 305, a copy of the shared electronic key 230 may be communicated to an app on a second or portable computing device 104 which also may be a registered device 104. An app may be a contained program operating on a portable computing device 104. The electronic key 230 may be used to show the receiver is trusted. The concept is similar to a key that opens a lock and only trusted people may have the key. Like a key to any lock, the key may only be shared with trusted people and in a trusted way such as over a secure channel. Logically, the communication to an app on a second computing device 104 of a copy of the shared electronic key 230 may be over a secure channel 215 between the app and the authorization server 210.

At block 310, a communication may be received from a first computing device 250 making a selection to use a system to complete a transaction. In one example and not limitation, the first computing device 250 may be a desktop or laptop computer. The first computing device 250 may be separate from the second computing device 104. In some embodiments, it may be helpful to have the first computing device 250 and second computing device 104 be in the same geographic area such that both computing devices 104 250 may be accessed within a small amount of time. For example, the second computing device 104 may be a portable computing device and the first computing device 250 may be a work station or laptop.

The system to complete a transaction may be a payment system. An example may be an electronic wallet such as Visa Checkout. In other embodiments, the system may be an electronic transfer system which may directly transfer money from one account to another. In addition, the system may be adapted to bitcoin or Etherium or other electronic ways to transfer value.

At block 315, an image 240 may be communicated to the first computing device 250. As mentioned previously, the image 240 may be re-drawn by a user on a registered device 104 as proof that the user is present and authorizes the transaction. The image 240 may be easier to enter than a pin. Thus the image 240 may be a challenge to be guess by a hacker but not be so complicated as to be un-copy-able by a standard user.

The image 240 may be created randomly. In one embodiment, a timer may be used to create the image 240 as the timer may be stopped at a random time. The image 240 may be based on the random number. In other embodiments, the image 240 may be selected from a group of images that have been pre-approved as being acceptable. The image 240 may be random but may not be so difficult that a user may not be able to reproduce the image without excessive effort. The images 240 are not necessarily unique. The images 240 may repeat over time. The server 210 may only make sure that unique patterns are released for all the open sessions associated with one username.

In some embodiments, the images 240 may be submitted by the user while registering for the system. For example, if a user is skilled at drawing a pine tree, the user may submit a plurality of drawings of a pine tree. In another embodiment, a user may submit a plurality of photos, the photos may be translated into drawings and the drawings may be used as the image 240. In yet another embodiment, a user may be able to select the images 240 to be communicated from a plurality of images. In these embodiments, the user may be able to select images 240 that the user is comfortable drawing.

In addition, the system may analyze the images 240 to ensure the images 240 are sufficient complex and distinct to avoid being easily guessed by a thief or to differentiate images 240 submitted by a thief from images 240 submitted by a legitimate user. The analysis may compare the submitted images 240 to known images and if the submitted images 240 are too similar, the submitted images 240 may be rejected. For example, if the submitted image 240 is of the letter A, the submitted image 240 may be rejected as being too simplistic. In another embodiment, the number of pixels used in the submitted image 240 may be analyzed and if the number is over a threshold, the submitted image may be accepted.

At block 320, a digital representation 244 entered by the user representing the image and the PIN calculated using the shared electronic key 230 may be received from the second computing device 104. The second computing device 104 may have a touch sensitive display and the user may be able to use a finger to draw the image on the display. In other embodiments, a pointing device such as a mouse, a joystick, a trackpad, a touch sensitive display, arrow keys or other drawing tools may be used to enter the image depending on the second device 104 and input options available.

The image 240 may only be valid for a set period of time. In this way, the image may not be guessed by an attacker or fraudster submitting an endless series of drawings over a long period of time. Logically, there also may be limits on the number of attempts. In addition, a user may be only granted a limited number of attempts at submitting an acceptable drawing.

Logically, the communication of the entered digital representation 244 may be communicated over a secure channel between the app on the second computing device 104 and the authorization server 210. In addition, the digital representation 244 entered by the user representing the image is converted into a code which may be understood by the authorization server. In some embodiments, the digital representation may be encrypted.

At block 325, the system may determine if the digital representation 244 entered by the user on the computing device if determined to match the image 240 communicated to the first computing device 250. Comparing a drawing to a digital representation may take on a variety of forms. At a high level, the system may attempt to block fraudulent attempts to guess the image while not blocking legitimate attempts to draw the image that were poor due to a variety of reasons. In some embodiments, a comparison may be made pixel by pixel. The distance from the actual pixel to the drawn pixel may be calculated and summed. If the drawing 244 was a perfect copy of the image 240, the sum may be 0. Similarly, the number of drawn in pixels may be compared to the pixels that should be blank and the difference may also be summed. The total drawing errors may be compared to a threshold a decision may be made whether the drawing is legitimate or is a fraudulent attempt to guess the image. In other embodiments, vector comparisons may be made. In some embodiments, there may be a closeness percentage or closeness threshold used to establish if the drawing 244 is close enough to the displayed image 240. For example, drawing may be a challenge for some users. Over time, the system may learn that the user is poor at drawing and the threshold may be made lower. In other embodiments, security may be imperative and the threshold may be made higher. In yet another embodiment, the random image 240 may be a line that connects a series of known points such as the digits on standard telephone receiver and the copy 244 may copy the line 240.

The comparison may be made by the server 210 or by the first computing device. In another embodiment, an outside source may be used to generate the random image 240 and to compare to the drawing 244 to the random image 240.

At block 327, if the determination that the copy of the image 244 was not sufficiently similar to the random image 240 was negative, the method may end. More specifically, the drawing 244 may not be over the similarity threshold to the image 240. In some embodiments, the drawing 244 may be poor and in other embodiments, someone may be trying to hack the account and may be guessing at the image 240 or inputting an incorrect image to be drawn.

At block 330, the system may determine if the PIN based on the copy of the shared electronic key 230 from the first computing device 104 is as expected. In some embodiments, the PIN 242 may change over time and the determination is not whether the PIN 242 is an exact match but is as expected at that point in time due to the PIN 242 changing. In other embodiments, the PIN may be static.

At block 332, if the determination that the PIN was not as expected and was negative, the method may end. As would be expected, if the PIN 230 is not as expected, the system may be locked to unwanted attempts to use the system At block 335, in response to determining the digital representation 244 entered by the user matches the image 240 and that the PIN based on the copy of the shared electronic key 230 from the second computing device 104 is as expected in view of the shared electronic key 230, the user may be authorized. As a result of the authentication, the user may be able to proceed such as making a purchase, making a reservation, etc.

A benefits of push image or pattern is that drawing a pattern or image may be more user friendly and interesting than the alternatives such as a code or PIN. Security may also be improved as the user has to approve the prompt and has to draw a pattern specific to the current authentication channel. There may be security advantages also. Assume an attacker who knows the username and password initiates an authentication attempt. Assume that in about the same time, the user starts a legitimate session. If the user only taps on a second channel authentication message (let's say taps on the PIN), the PIN can be transferred to the server. However, the server cannot verify which session has been approved by the user (the attacker session or the user's valid session). Adding the pattern, distinguishes these two sessions. By drawing the same image as the one that has been displayed, the user may bind the approval to his/her own session.

Figure 4:
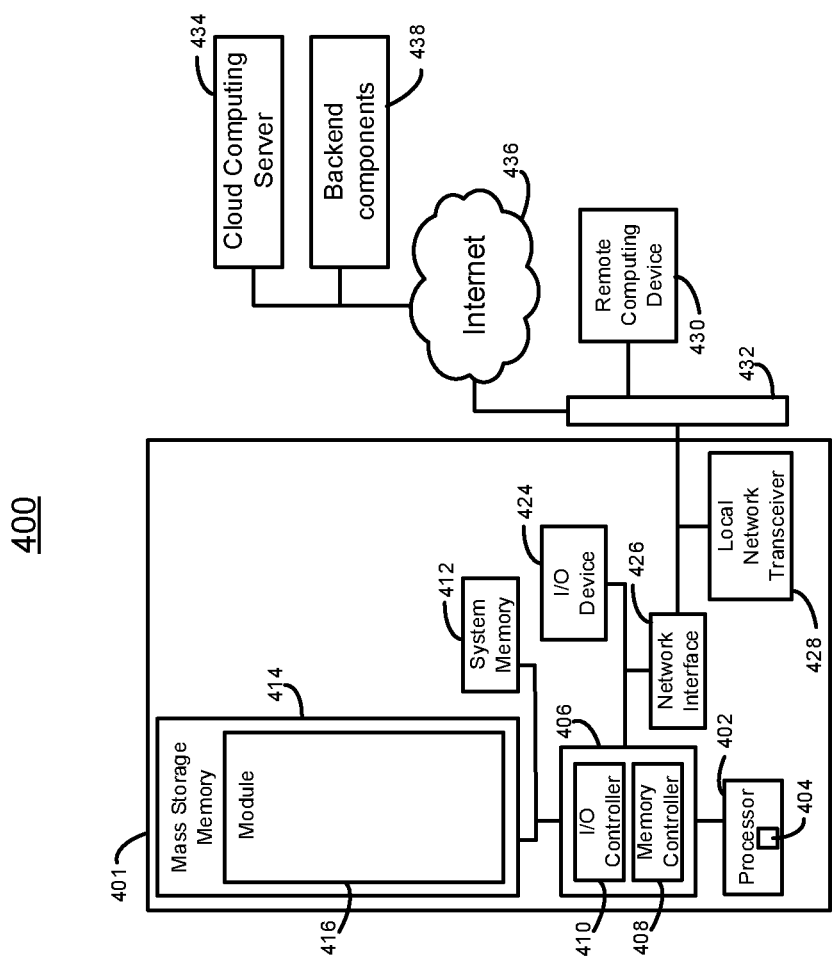
FIG. 4 may be an illustration of a sample computing device which may be physically configured to be used as part of the system.

FIG. 4 is a high-level block diagram of an example computing environment 400 for the system 100 and methods (e.g., method 300) as described herein. The computing device 400 may include a server, a mobile computing device, a cellular phone, a tablet computer, a Wi-Fi-enabled device or other personal computing device capable of wireless or wired communication, a thin client, or other known type of computing device (e.g., a mobile computing device 104, a merchant computer system 106, a payment network system 108 and a payment device issuer system 111, etc.). Logically, the computing device 400 may be designed and built to specifically execute certain tasks.

As will be recognized by one skilled in the art, in light of the disclosure and teachings herein, other types of computing devices can be used that have different architectures. Processor systems similar or identical to the example systems and methods described herein may be used to implement and execute the example systems and methods described herein. Although the example system 400 is described below as including a plurality of peripherals, interfaces, chips, memories, etc., one or more of those elements may be omitted from other example processor systems used to implement and execute the example systems and methods. Also, other components may be added.

As shown in FIG. 4, the computing device 401 includes a processor 402 that is coupled to an interconnection bus.

The processor 402 includes a register set or register space 404, which is depicted in FIG. 4 as being entirely on-chip, but which could alternatively be located entirely or partially off-chip and directly coupled to the processor 402 via dedicated electrical connections and/or via the interconnection bus. The processor 402 may be any suitable processor, processing unit or microprocessor. Although not shown in FIG. 4, the computing device 401 may be a multi-processor device and, thus, may include one or more additional processors that are identical or similar to the processor 402 and that are communicatively coupled to the interconnection bus.

The processor 402 of FIG. 4 may be coupled to a chipset 406, which includes a memory controller 408 and a peripheral input/output (I/O) controller 410. As is well known, a chipset typically provides I/O and memory management functions as well as a plurality of general purpose and/or special purpose registers, timers, etc. that are accessible or used by one or more processors coupled to the chipset 406. The memory controller 408 performs functions that enable the processor 402 (or processors if there are multiple processors) to access a system memory 412 and a mass storage memory 414, that may include either or both of an in-memory cache (e.g., a cache within the memory 412) or an on-disk cache (e.g., a cache within the mass storage memory 414).

The system memory 412 may include any desired type of volatile and/or non-volatile memory such as, for example, static random access memory (SRAM), dynamic random access memory (DRAM), flash memory, read-only memory (ROM), etc. The mass storage memory 414 may include any desired type of mass storage device. For example, the computing device 401 may be used to implement a module 416 (e.g., the various modules as herein described). The mass storage memory 414 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 401, the systems and methods described herein. Thus, a module, block, function, operation, procedure, routine, step, and method can be implemented in hardware, firmware, and/or software. In one embodiment, program modules and routines are stored in mass storage memory 414, loaded into system memory 412, and executed by a processor 402 or can be provided from computer program products that are stored in tangible computer-readable storage mediums (e.g. RAM, hard disk, optical/magnetic media, etc.).

The peripheral I/O controller 410 performs functions that enable the processor 402 to communicate with a peripheral input/output (I/O) device 424, a network interface 426, a local network transceiver 428, (via the network interface 426) via a peripheral I/O bus. The I/O device 424 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 424 may be used with the module 416, etc., to receive data from the transceiver 428, send the data to the components of the system 100, and perform any operations related to the methods as described herein. The local network transceiver 428 may include support for a Wi-Fi network, Bluetooth, Infrared, cellular, or other wireless data transmission protocols. In other embodiments, one element may simultaneously support each of the various wireless protocols employed by the computing device 401. For example, a software-defined radio may be able to support multiple protocols via downloadable instructions. In operation, the computing device 401 may be able to periodically poll for visible wireless network transmitters (both cellular and local network) on a periodic basis. Such polling may be possible even while normal wireless traffic is being supported on the computing device 401. The network interface 426 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 408 and the I/O controller 410 are depicted in FIG. 4 as separate functional blocks within the chipset 406, the functions performed by these blocks may be integrated within a single integrated circuit or may be implemented using two or more separate integrated circuits. The computing environment 400 may also implement the module 416 on a remote computing device 430. The remote computing device 430 may communicate with the computing device 401 over an Ethernet link 432. In some embodiments, the module 416 may be retrieved by the computing device 401 from a cloud computing server 434 via the Internet 436. When using the cloud computing server 434, the retrieved module 416 may be programmatically linked with the computing device 401. The module 416 may be a collection of various software playgrounds including artificial intelligence software and document creation software or may also be a Java® applet executing within a Java® Virtual Machine (JVM) environment resident in the computing device 401 or the remote computing device 430. The module 416 may also be a "plug-in" adapted to execute in a web-browser located on the computing devices 401 and 430. In some embodiments, the module 416 may communicate with back end components 438 via the Internet 436.

The system 400 may include but is not limited to any combination of a LAN, a MAN, a WAN, a mobile, a wired or wireless network, a private network, or a virtual private network. Moreover, while only one remote computing device 430 is illustrated in FIG. 4 to simplify and clarify the description, it is understood that any number of client computers are supported and can be in communication within the system 400.

Additionally, certain embodiments are described herein as including logic or a number of components, modules, blocks, or mechanisms. Modules and method blocks may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a processor configured using software, the processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "embodiments," "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method of electronic authentication comprising:
receiving, at an authentication server, a plurality of drawings of an object from a user via a first computing device over a communications channel during a registration of the first computing device with a payment system, wherein the plurality of drawings of the object are used as an image, and wherein the image comprises a plurality of image pixels;
analyzing, by the payment system, the image to determine whether a number of the plurality of image pixels is over a first threshold;
in response to the number being over the first threshold, accepting the image by the payment system as an authentication image;
storing, at the authentication server, a shared electronic key;
communicating, from the authentication server over the communications channel, to an application on a second computing device a copy of the shared electronic key;
receiving, at the authentication server, from the first computing device, a selection from the user to use the payment system to complete a transaction;
communicating, over the communications channel, the authentication image to the first computing device;
receiving, at the authentication server, from the second computing device a digital representation entered by the user representing the authentication image and a PIN calculated using the copy of the shared electronic key, wherein the digital representation comprises a plurality of digital representation pixels;
determining, via the authentication server, whether the digital representation entered by the user on the second computing device matches the authentication image communicated to the first computing device by comparing the plurality of image pixels to the plurality of digital representation pixels, wherein the comparison comprises the steps of:
calculating a distance between each pixel of the plurality of image pixels to each pixel of the plurality of digital representation pixels,
calculating a sum of the distances between each pixel of the plurality of image pixels and each pixel of the plurality of digital representation pixels, and,
comparing the sum to a second threshold, and
in response to the sum being less than the second threshold, determining that the digital representation matches the authentication image;
determining, via the authentication server, whether the PIN is an expected number;
in response to determining the digital representation entered by the user matches the authentication image and the PIN from the second computing device is the expected number, authorizing the user, via the authentication server, to perform the transaction.

2. The method of a claim 1, wherein digital representation entered by the user representing the authentication image is converted into a code.

3. The method of claim 1, wherein the authentication image can be inputted on a mobile computing device.

4. The method of claim 1, wherein the communication channel is a secure channel.

5. The method of claim 1, wherein the authentication image is valid only for a current session.

6. The method of claim 1, further comprising verifying the application is on a registered device of the user by generating and automatically submitting a one time PIN computed as the keyed function of a counter using hash based message authenticated code (HMAC) based on one time password algorithm (HOTP).

7. An authorization server comprising a processor, a memory in communication with the processor and an input-output circuit, the processor being physically configured for:
receiving a plurality of drawings of an object from a user via a first computing device over a communications channel during a registration of the first computing device with a payment system, wherein the plurality of drawings of the object are used as an image, and wherein the image comprises a plurality of image pixels,
wherein the image is analyzed by the payment system to determine whether a number of the plurality of image pixels is over a first threshold, and
wherein in response to the number being over the first threshold, the image is accepted by the payment system as an authentication image;
storing a shared electronic key;
communicating, via the communications channel, to an application on a second computing device a copy of the shared electronic key;
receiving from the first computing device, a selection from the user to use the payment system to complete a transaction;
communicating, via the communications channel, the authentication image to the first computing device;
receiving from the second computing device a digital representation entered by the user representing the authentication image and a PIN calculated using the copy of the shared electronic key;
determining whether the digital representation entered by the user on the second computing device matches the authentication image communicated to the first computing device by comparing the plurality of image pixels to the plurality of digital representation pixels, wherein the comparison comprises:
calculating a distance between each pixel of the plurality of image pixels to each pixel of the plurality of digital representation pixels,
calculating a sum of the distances between each pixel of the plurality of image pixels and each pixel of the plurality of digital representation pixels, and,
comparing the sum to a second threshold, and in response to the sum being less than the second threshold, determine that the digital representation matches the authentication image;

determining whether the PIN communicated from the second computing device is an expected number;

in response to determining the digital representation entered by the user matches the authentication image and the PIN from the second computing device is the expected number, authorizing the user to perform the transaction.

8. The authorization server of claim 7, wherein digital representation entered by the user representing the authentication image is converted into a code.

9. The authorization server of claim 7, wherein the authentication image can be inputted on a mobile computing device.

10. The authorization server of claim 7, wherein the communications channel is a secure channel.

11. The authorization server of claim 7, wherein the authentication image is valid only for a current session.

12. The authorization server of claim 7, further comprising verifying the application is on a registered device of the user by generating and automatically submitting a one time PIN computed as the keyed function of a counter using hash based message authenticated code (HMAC) based on one time password algorithm (HOTP).

13. The method of claim 1, wherein the transaction is a payment transaction.

14. The method of claim 1, wherein the transaction is a reservation.

15. The method of claim 1, wherein the plurality of drawings of the object received during the registration of the first computing device are drawn by the user on a touch sensitive display of the first computing device.

16. The method of claim 1, wherein the digital representation of the authentication image is entered by the user drawing the authentication image on a touch sensitive display of the second computing device.

17. The method of claim 16, wherein the second threshold is lowered by the payment system based on the payment system learning the user's drawing behavior.

18. The method of claim 1, wherein the first computing device and the second computing device are in the same geographic location, and wherein the geographic location is the user's home or the user's office.

\* \* \* \* \*